Figure 1:
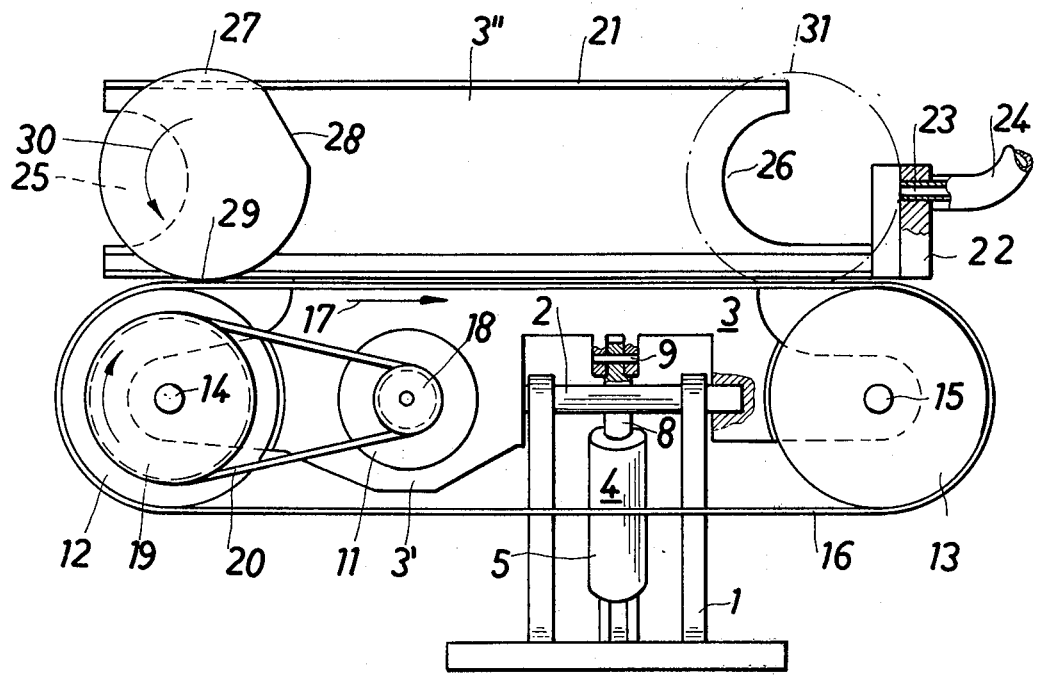

United States Patent [19]

Jaksch

[11] 3,997,065
[45] Dec. 14, 1976

[54] DEVICE FOR POSITIONING SUBSTRATE WAFERS

[75] Inventor: Erhard Jaksch, Dresden, Germany

[73] Assignee: Jenoptik Jena G.m.b.H., Jena, Germany

[22] Filed: Dec. 22, 1975

[21] Appl. No.: 641,708

[30] Foreign Application Priority Data

Mar. 4, 1975  Germany ............................ 184533

[52] U.S. Cl. .............................. 214/1 BD; 198/394; 198/415; 214/1 BV; 214/1 Q; 214/147 T
[51] Int. Cl.² ........................................ B65G 47/24
[58] Field of Search ............ 214/1 BD, 1 Q, 147 T; 198/257, 282, 283

[56] References Cited
UNITED STATES PATENTS

| | | | |
|---|---|---|---|
| 3,297,134 | 1/1967 | Pastuszak | 198/257 X |
| 3,890,508 | 6/1975 | Sharp | 198/257 X |

Primary Examiner—Robert J. Spar
Assistant Examiner—George F. Abraham

[57] ABSTRACT

A device for positioning substrate wafers with a flat zone on their periphery comprises a support in which a tilting member is tiltably mounted by means of a pinion. The tilting member is provided with two rollers rotatably seated thereon for guiding a belt in the longitudinal direction of said tilting member. At least one of said rollers is driven by a respective drive means. A support track is arranged on the longitudinal side of the tilting member for receiving said substrate wafers.

2 Claims, 2 Drawing Figures

DEVICE FOR POSITIONING SUBSTRATE WAFERS

This invention concerns a device for positioning substrate wafers, particular for use in integrated circuits. A previous device for positioning substrate wafers, the periphery of which is provided with a flat zone, centers wafers in slipping a cone there over.

In a first step the wafers are centered relative to the cone axis. Then the wafers are turned and light electrical means scan the flat zones on the periphery for a subsequent automatical positioning.

Said device is disadvantageous because high expenditures, particularly due to the electronical components employed are required to obtain well positioned substrate wafers. Furthermore, the very fragile substrate wafers are mechanically loaded by said device, which involves the danger of breakage.

It is an object of the present invention to obviate the above disadvantages.

It is a further object of the present invention to reduce the expenditures involved in a device for positioning substrate wafers.

It is still a further object of the present invention to provide a device which reduces the danger of breakage in the course of positioning substrate wafers.

Accordingly, the present invention is concerned with a device for positioning substrate wafers, characterised in that a tilting member secured to a support is provided with a support track upon which the substrate wafers rest with their flat sides. The tilting member is further provided with a first and a second roller adapted to guide a belt. One of the rollers is connected to a drive means for moving said belt.

In order that the invention may be more readily understood, reference is made to the accompanying drawings which illustrate diagrammatically and by way of example one embodiment thereof and in which:

FIG. 1 shows a front view of the device according to the invention, and

Figure 2:
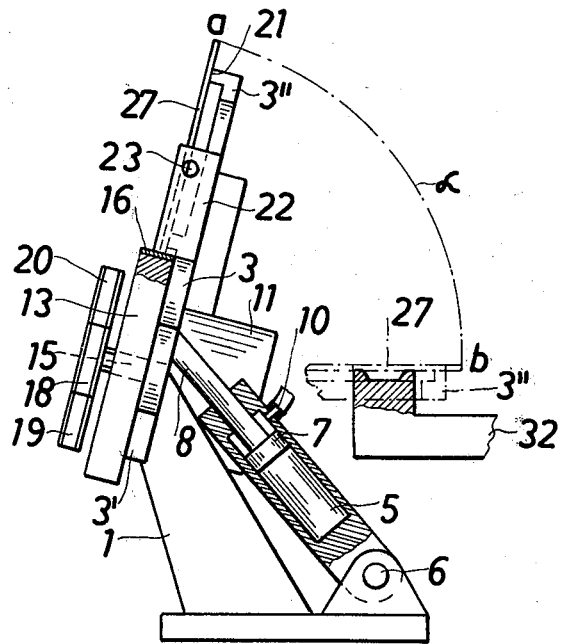

FIG. 2 a side view of the device according to FIG. 1.

In FIG. 1 a device for positioning substrate wafers comprises a support 1, in the upper part of which a pinion 2 is arranged for mounting a tilting member 3, tiltable about an angle $\alpha$ of about 90°.

A means 4, secured both to the support 1 and to the tilting member 3, is provided to enable the tilting of said member 3. In FIG. 2 said means 4 is represented in more detail. Said means 4 comprises a plunger 7 arranged in a cylindrical plunger case 5, which is hinged via a pin 6 to the support 1.

The plunger 7 is attached to a rod 8 which is hinged to the tilting member 3. The connection is established by a pinion 9.

A portion 10 of the case 5 is embodied in such a manner to permit the introduction of a means, air or a liquid, into the case 5 for exerting a pressure upon the plunger 7, in order to displace it in direction of the pin 6. Accordingly, the rod 8 displaces the tilting member 3 from a position $a$ to a position $b$, as shown in FIG. 2. The means which effects the tilting can alternatively comprise a worm-gear spindle or a rack and pinion. A lower portion 3' of the tilting member 3, as can be seen in FIGS. 1 and 2, is provided with a drive means 11, for example, an electro-motor, and a first roller 12 and second roller 13, both rotatably seated on shafts 14 and 15, respectively. The rollers 12, 13 are located in one plane on opposite ends of the portion 3'. Advantageously an endless belt 16 is guided around both rollers 12, 13, which is moved in a direction indicated by an arrow 17. The roller 12 is driven by a drive pulley 18 which transmits its rotations via a driving belt 20 to a belt pulley 19.

The belt pulley arrangement can also be replaced by any other convenient means, for example, a gear means. Alternatively, both rollers 12, 13 can directly be rotated by the driving means 11.

An upper portion 3'' of the tilting member 3 is provided with a support track 21, which substantially extends alongside the tilting member 3 in parallel with the straight portion of the belt 16.

Particularly, as shown in FIG. 1, an arrest member 22 is secured to the tilting member 3 provided with a bore hole 23. Said hole 23 establishes a connection to a not shown suction device via a hose 24.

The positioning procedure of substrate wafers 27, having a flat zone 28 on their periphery, is described hereinafter. The substrate wafers 27 are fed into the left end of the upper portion 3'' of the tilting member 3, where they are placed upon the belt 16.

The wafers 27 lie with their flat sides upon the support track 21 and with their periphery upon the belt 16. The belt 16 is continuously moved in the sense indicated by the arrow 17 by means of the driving means 11, the driving belt 20 and the first roller 12. Due to the friction forces occuring between the belt 16 and the periphery 29 of the substrate wafers 27, the latter are conveyed in the running direction of the belt 16. Friction forces occuring between the flat sides of the wafers 27 and the support track 21, when the wafers 27 are moved upon said track 21, are opposed to the friction forces between the belt 16 and the substrate wafers 27. Hence, the speed, with which the wafers 27 are conveyed, is braked and, in addition to the movement in the running direction of the belt 16 the wafers 27 are rotated in the sense indicated by an arrow 30. The wafers 27 are rotated until the flat zones 28 contact the belt 16. As the frictional forces between the wafers 27 and the track 21 are not strong enough to rotate the wafers 27 any further, the rotation ceases. This position obtained, the wafers 27 are conveyed by the belt 16 to the right end of the support track 21 until they are stopped at the arrest member 22 (position 31 of the wafers 27 indicated in dashed lines). The wafers 27 are now positioned with the flat zones 28 in contact with the belt 16. As a next step the tilting member 3 is pivoted from a position $a$ into a position $b$, from whence the arms 32 of a discharge means (FIG. 2) take the wafers 27 off through a recess 26. The pivot angle $\alpha$ of the tilting member 3 is responsible for the friction powers to act in the manner as described hereinbefore.

Therefore the frictions between the wafers 27 and the track 21, on the one hand, and between the wafers 27 and the belt 16, on the other hand, have to be adjusted via the means, described hereinabove, which effect the tilting.

In FIG. 1, the arrest member 22, at the right end of the upper portion 3'' of the tilting member 3, is provided with a bore hole 23 connected to a not shown suction device. By virtue of said device, the wafers 27 are sucked thereto. In this manner the wafers 27 are maintained in the desired position and it is made sure that the once positioned wafers 27 are not de-positioned in the course of the pivot operation from $a$ to $b$.

I claim:

1. A device for positioning substrate wafers having a flat zone on their periphery, comprising a support having a pinion, a tilting member, being tiltably arranged about said pinion of said support,
means for tilting said tilting member about said pinion,
said means being secured both, to said support and to said tilting member,
a drive means provided at said tilting member,
a first roller and a second roller,
both rollers being rotatably mounted on opposite ends of said tilting member in one plane,
at least one of said rollers being connected to said drive means,
a belt being guided by said first and said second rollers,
a support track provided on said tilting member,
said support track being substantially arranged along said tilting member and being substantially in parallel to said belt,
said support track being adapted to receive and to convey said substrate wafers.

2. A device as claimed in claim 1, wherein an arrest member is provided at one end of said tilting member.

* * * * *